United States Patent [19]
Silverstein

[11] 3,789,710
[45] Feb. 5, 1974

[54] METHOD AND APPARATUS FOR PRODUCING A POROUS PLASTIC FILM

[75] Inventor: Paul Silverstein, Creve Coeur, Mo.

[73] Assignee: Applied Synthetics Corp., Washington Park, E. St. Louis, Ill.

[22] Filed: Sept. 10, 1971

[21] Appl. No.: 179,478

[52] U.S. Cl............ 83/16, 83/30, 83/168, 83/171, 83/660
[51] Int. Cl............ B26f 1/24, B26f 3/08
[58] Field of Search....... 83/171, 16, 168, 169, 660, 83/30

[56] References Cited
UNITED STATES PATENTS

| | | | |
|---|---|---|---|
| 3,146,283 | 8/1964 | DaValle | 83/171 X |
| 3,546,742 | 12/1970 | Kugler | 83/171 X |
| 3,245,294 | 4/1966 | Butter et al. | 83/16 |
| 3,064,563 | 11/1962 | Cook | 83/171 UX |
| 3,526,349 | 9/1970 | Moro | 83/660 X |
| 2,526,650 | 10/1950 | Gaibel | 83/171 |
| 2,748,863 | 6/1956 | Benton | 83/171 |
| 3,227,854 | 1/1966 | Ramsey et al. | 83/171 X |
| 3,627,983 | 12/1971 | Pickering | 83/168 X |

*Primary Examiner*—Frank T. Yost
*Attorney, Agent, or Firm*—Burton L. Lilling; James E. Siegel; Henry A. Marzullo, Jr.

[57] ABSTRACT

The present invention provides a method and apparatus for producing a porous plastic film and contemplates, in a preferred embodiment, feeding a continuous web of plastic film material by feed means, such as rollers, past a drum having a plurality of outwardly extending projections or tips mounted on the eternal surface thereof, whereby the tips are heated to a predetermined temperature and the plastic film is brought in contact with said tips to cause minute, microscopic reinforced apertures to be burned in said plastic film to form pores or apertures therein. Thereafter, if necessary, the tips are then heated to a higher temperature to burn off any residue of plastic material remaining thereon and then cooled to the desired predetermined temperature before again being brought into contact with the continuously fed plastic film.

19 Claims, 11 Drawing Figures

INVENTOR.
PAUL SILVERSTEIN

PATENTED FEB 5 1974

INVENTOR.
PAUL SILVERSTEIN

BY
*Lilling and Siegel*
ATTORNEYS

INVENTOR.
PAUL SILVERSTEIN

BY
Lilling and Siegel
ATTORNEYS

INVENTOR.
PAUL SILVERSTEIN

METHOD AND APPARATUS FOR PRODUCING A POROUS PLASTIC FILM

BACKGROUND OF THE INVENTION

The present invention pertains to a method and apparatus for producing porous or apertured plastic film material, which material may be used for a variety of purposes, such as in the manufacture of sheets and pillowcases, packaging (bags and wrappings), such as tea bags, food and produce wraps, etc., disposable soft goods, or the like. Also, other uses and applications for such porous material may include plastic mulch for agriculture use, industrial filters, upholstery, wall coverings, laminations; and sanitary and medical applications, such as in making of disposable diapers and in manufacturing surgical dressings and bandages.

Heretofore, it has been exceedingly difficult and costly to produce a breathable or porous plastic film. The pores or apertures are highly desirable for certain applications requiring the passage of air therethrough. More particularly, the porous film produced by the new and novel apparatus of the present invention is highly suitable for fabrication into various types of wearing apparel whereby it is mandatory that the film be capable of "breathing," to facilitate proper ventilation.

One of the methods which heretofore have been devised to form apertures or pores in plastic films is that of utilizing laser beams; however, none of these methods have been widely accepted for a number of reasons, and in the case of the laser technique, such advanced technological apparatus is extremely costly and is dangerous and diffuclt to operate.

SUMMARY OF THE INVENTION

Accordingly, it is the primary object of the present invention to provide a new and novel method and apparatus for making a porous plastic film material which is relatively inexpensive to manufacture and to operate.

It is another object of the present invention to provide a new and novel method and apparatus for making a porous plastic film material in a continuous manner.

It is a further object of the present invention to provide a method and apparatus of the aforedescribed type wherein the pores or apertures are formed in the plastic film material in a non-linear manner whereby there are no distinct lines of weakening or tear lines.

It is still another object of the invention to provide a method and apparatus of the aforedescribed type wherein the pores formed in the plastic film material are produced by apertures burned in the film by means of heated elements.

It is a more particular object of the present invention to provide a new and novel method and apparatus for making a porous plastic film material by successively unrolling and then rolling said web of material and concomitantly therewith passing said web of material over heating elements which are at a first predetermined heated temperature to cause apertures to be burned in the web and which may then be heated to a higher temperature to burn-off any residue of plastic material remaining thereon, thereby precluding build up of deposits and oxides on the heating elements.

BRIEF DESCRIPTION OF THE DRAWINGS

These and other objects, features and advantages of the present invention will become more apparent from the detailed description to follow hereinafter considered in conjunction with the accompanying drawings wherein.

DESCRIPTION OF THE PREFERRED EMBODIMENTS

Figure 1:
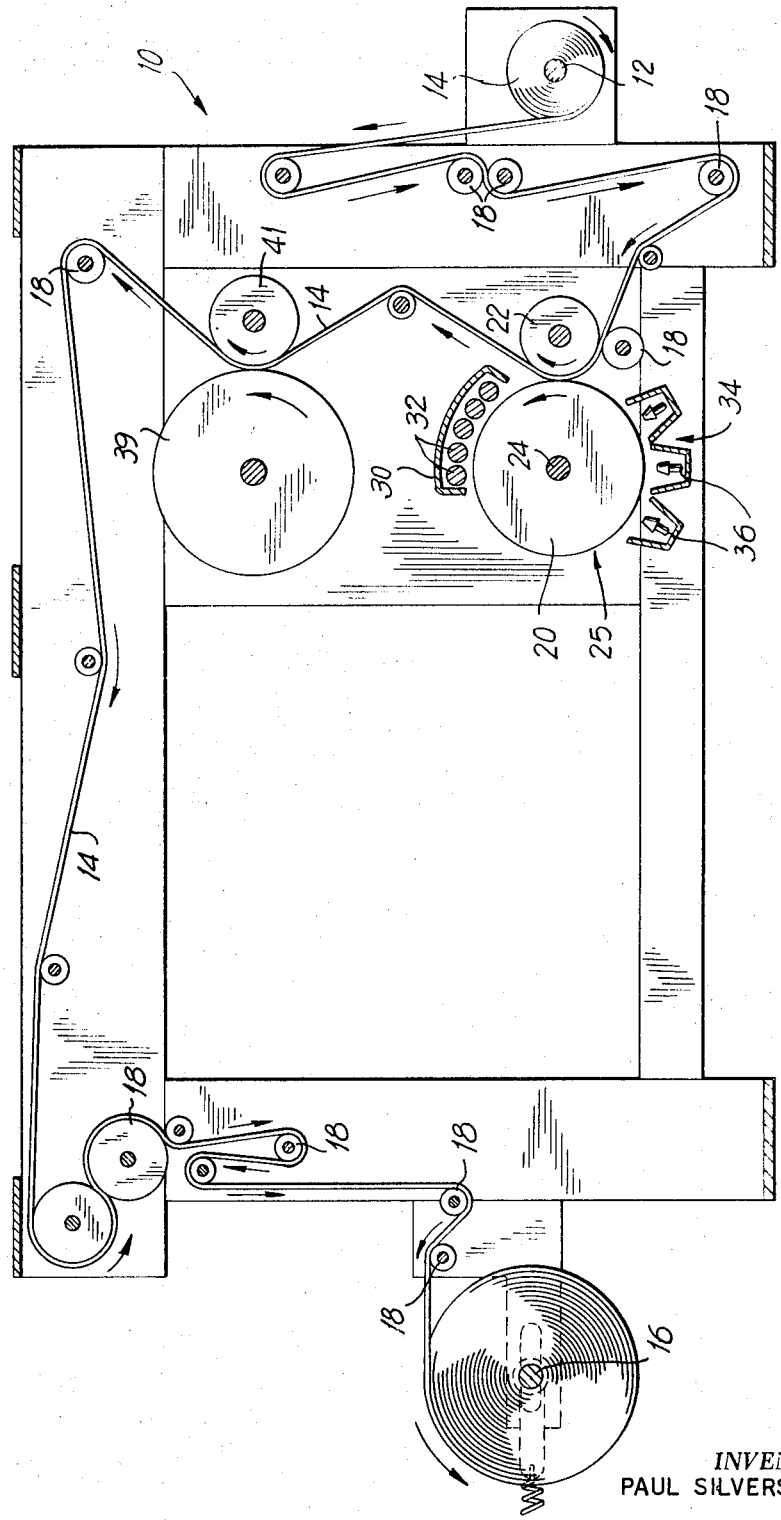
FIG. 1 is a schematic representation of an apparatus constructed in accordance with a first embodiment of the present invention for forming porous plastic film material.

Referring now to the drawings, and more particularly to FIG. 1 thereof, there is shown an apparatus, generally designated by the reference numeral 10, for making porous webs of plastic film material constructed in accordance with the principles of the present invention.

The overall apparatus 10 generally comprises an initial web supply or feeding stage, a latter rewind stage, an intermediate perforating or burning stage for making the apertures or pores. The apparatus, however, may also include other stages prior to or subsequent the burning stage for other applications, such as embossing, printing or other finishing and/or secondary operations.

In the web feeding stage, which is conventional like the rewind stage, the apparatus 10 may include a first spindle 12 upon which is placed a web of untreated plastic film material 14 and at the rewind stage, the apparatus may include a spindle 16 upon which the treated (porous) plastic film is rolled. The spindles or rolls are shown herein for purposes of simplicity as a single roll at opposite ends of the apparatus, although two-spindle "continuous" feeders and rewinders can be employed with the apparatus of the present invention so that, for example, in a continuous winder or "rewinder", when one spindle has just about completed its winding cycle, the other spindle is brought into a position to pick up the web which is then severed and transferred to the empty spindle. In the present application, spindle 16 is connected to a suitable drive means or rotating mechanism (not shown) of any one of a variety of standard constructions which would cause rotational movement of the spindle to thereby cause the web of plastic film material 14 to be unrolled from the spindle 12 and rolled upon the spindle 16. There may also be provided, if desired, additional intermediate drive means for feeding the web or film through said apparatus and same would be driven synchronously with such drive means.

The apparatus of the present invention also includes a plurality of guide and film tensioning means in the form of guide and pinch rollers, all generally designated by the reference numeral 18.

The rotational movement of spindle 16 causes the web of plastic film material to be fed thereto from the spindle 12. The plastic film material thus is caused to pass between a rotatable drum 20 and backup or pinch roller 22 whose purpose and operation will be described more fully hereinafter. The backup roller 22 may be of any suitable resilient material, such as silicon rubber and the gap between same and the drum 20 is about 0.005 inch. The gap, of course, is actually a function of the web material thickness and also is a function of pore size.

The drum 20, which is the heart of the invention, is rotatable about a spindle 24 and may rotate by means of the movement imparted thereto by the plastic film 14 disposed between the drum 20 and pinch roller 22, or it may be made rotatable by connecting the spindle 24 of the drum to a rotating mechanism in the same manner as spindle 16. It will be appreciated, however, that the annular speed of rotation of the spindles 16 and 24 must be equal so as to maintain the proper tension on the plastic film 14 and to permit the plastic film to be fed from the spindle 12 to the spindle 16 without tearing the film at any position therebetween. In this regard, it is to be noted that a simple mechanism for accomplishing the above would be to gear the spindle 16 to spindle 24 and utilize a single rotating mechanism for both spindles.

Figure 2:
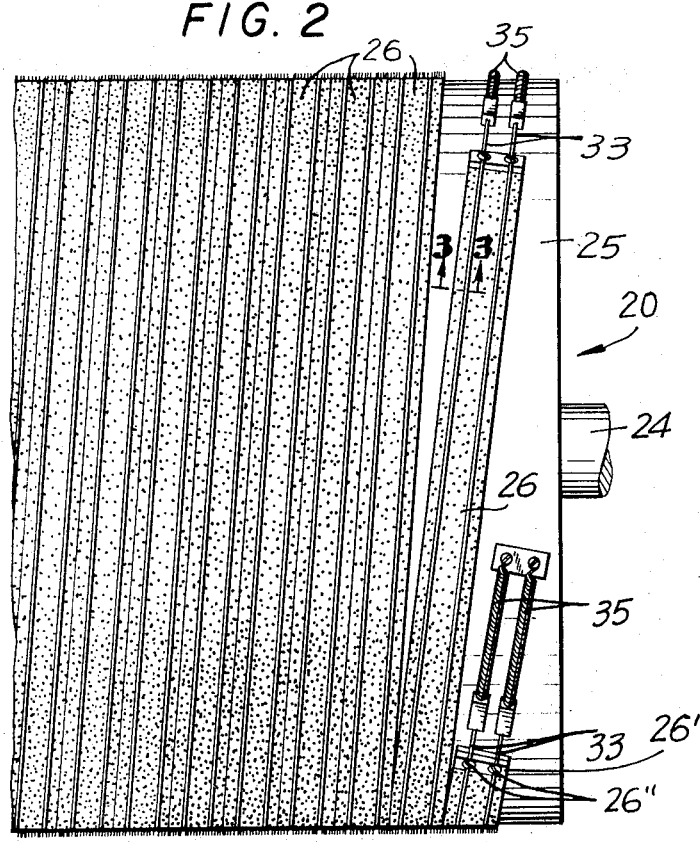
FIG. 2 is a partial elevational view of the external surface of the drum of the apparatus of FIG. 1 and depicts the heating elements and their carrier strips mounted upon the drum.

Positionally secured on the outer surface 25 of drum 20 are a plurality of carrier strips 26 forming a drum assembly. The strips are provided with a plurality of heatable elements 28, as best seen in FIG. 2. The elements 28 may, if desired, be round in cross-sectional area, square, hex-shaped, etc. In the present embodiment, the preferred shape of rectangular cross section is shown. The strips 26 are preferably fabricated of a reinforced silicon rubber having a high strength backing and the elements 28 are preferably fabricated of some heat conducting metal material (such as cold rolled steel); however, any other suitable materials may be employed equally as well.

Figure 3:
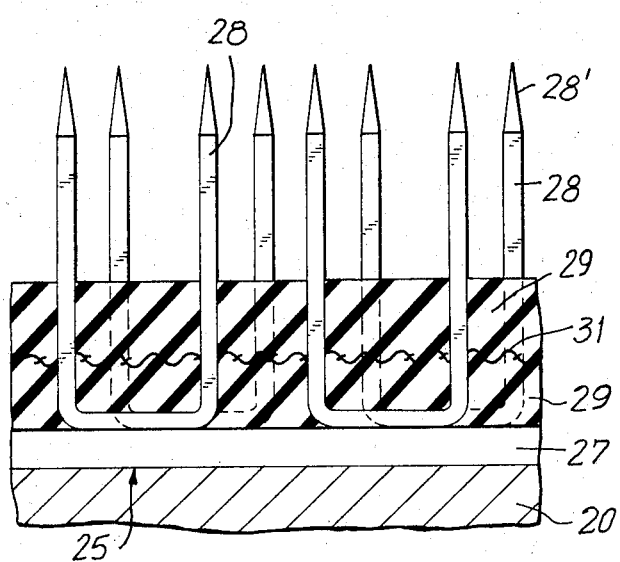
FIG. 3 is an enlarged sectional view, taken along the line 3—3 of FIG. 2, depicting the heating elements and their carrier strips mounted upon the drum, which construction may also be employed in a second embodiment of the invention.

Referring now to FIGS. 2 and 3, the carrier strips 26 preferably comprises a backing layer 27 of high strength material, such as "Temp-R-Tape GV" available from the Connecticut Hard Rubber Co. of New Haven, Connecticut 06509. Suitably affixed to this backing is a plurality of layers 29 of Cohrlastic (trademark of the Conn. Hard Rubber Co.) having an intermediate layer 31 of a high strength material, such as fiberglass. Such silicone rubber carrier strips resist temperature extremes and its physical characteristics are not adversely affected by exposure to temperatures ranging from about −100°F to about +500°F. In addition, such construction and overall structure is tough, elastic and resilient and these characteristics as well as other physical properties are retained under a variety of operating conditions and under environmental demands that would cause other elastomers to fail.

The carrier strips 26 are secured at their ends 26' by suitable fasteners, such as screws 26'', to the drum 20. Each carrier strip 26 is also further retained in place against the peripheral surface 25 of the drum 20 particularly when same is under high centrifugal force by means of tying wires 33 held tought under tension by biasing means or extension springs 35. These wires 33 are preferably of a thermally stable metal, for example, molybdenum or a nickel chromium alloy (such as "Nichrome V"). In the instant embodiment, the backing is about 1 ¾ inches wide and the heating elements extend centrally across about 1 ½ inches of such width.

The number of apertures may, of course, be varied from about 32 holes per inch to about 880 holes per inch, and the pattern per se can be of any desired layout or arrangement. In the present embodiment, the ends of the staples of each row of staples are positioned so as to reside approximately in the middle of the staples of each adjacent row so as to form a diamond-like pattern.

It is herein to be noted that the elements 28 are preferably U-shaped pins or staples embedded in the strips 26 with the ends of the staples protruding outwardly from the strips and the staples may be disposed at an acute angle with the backing or they may even be substantially perpendicular thereto. Also, the upwardly protruding ends of the elements 28 are preferably provided with an inclined sharp lending edge 28' or tip with respect to the lower ends thereof. This feature is for the purpose of insuring that the upper ends do not remain in the apertures formed thereby, as will be explained more fully hereinafter, so as to avoid any possibility of ripping of the plastic film 14 upon withdrawal of the elements 28 from the film as the drum continues to rotate.

The carrier strips 26 are preferably disposed upon the outer surface of drum 20 in a spiral configuration having a helix angle of from about 4° to about 5°. This results in the ends of the elements 28 also being disposed in a spiral pattern (FIG. 2), so as to form a spiral perforation pattern which will not provide any distinct tear lines in the plastic film being treated. Thus, any lateral or longitudinal stress placed upon the film 14 will not result in the same being easily torn. Of course, if a sufficient tensile force is imparted to the film it will tear. However, such force is well beyond that imparted to the plastic film in the normal use thereof.

Although in the particular embodiment of the invention hereinabove described, the carrier strips 26 and the elements 28 thereof have been positioned on the drum 20 so as to form a spiral perforation pattern, any disposition of the carrier strips 26 and elements 28 which results in a non-linear or irregular geometric perforation pattern can be successfully employed.

Referring now to the operation of the apparatus 10, reference is again had to FIG. 1, wherein it will be seen that the plastic film 14 is passed by means of the rotating spindles 16 and 24 and the rollers 18 past the abuttingly engaging surfaces of the drum 20 and the pinch roller 22. At this time, the elements 28 on the strips 26 have first been heated to a first predetermined temperature by a heater 30, which may be a gas heater having a plurality of individual gas jets 32, preferably burners at the bottom of the drum (not shown) and burners at the top of the drum so as to provide thermal stability of the drum. The heater is positioned adjacent the drum surface at a rotational position which is almost immediately after the engagement of the external drum surface 25 with the pinch roller 22. The elements 28 may then, if desired, be cooled slightly to a second predetermined temperature by an air cooler 34 having a plurality of individual air jets 36. It is to be noted that although the second predetermined temperature is less than the first predetermined temperature it is still substantially higher than the ambient temperature of operation of the apperatus 10 and operative to cause the elements 28 to burn apertures in the film 14, as will appear hereinafter.

As best seen in FIGS. 5–8, the plastic film 14 is maintained taut against the external surface of pinch roller 22. As the film passes between the roller 22 and drum 20, the upper ends of the elements 28 which have been heated to the second predetermined temperature come in contact with the film 14 and the elevated temperatures of the elements 28 cause apertures 38 to be burned in the film 14.

Figure 4B:
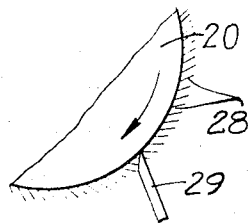
FIG. 4B is an enlarged sectional view showing part of the drum and a planar bar or flicker which facilitates wiping and cleaning of the heating elements.
Figure 4:
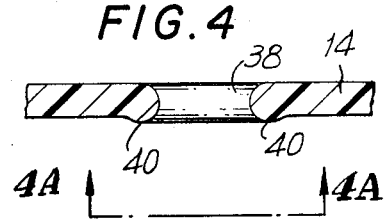
FIG. 4 is an enlarged sectional view depicting the apertured formation in the plastic film web.
Figure 4A:
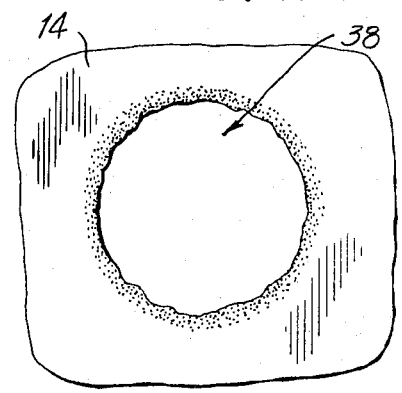
FIG. 4A is a plan view, taken on the line 4A—4A of FIG. 4, greatly enlarged to more clearly show the construction of the aperture formed by the method of the present invention.
Figure 5:
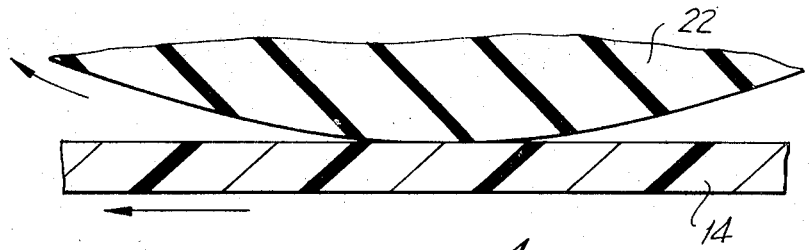
FIG. 5 is an enlarged partial sectional view depicting the drum, plastic film web and heating elements constructed in accordance with the present invention.

As best seen in FIGS. 4 and 4A, the burning of the film produces an aperture 38 of a substantially irregular, round and somewhat jagged configuration with raised or beaded peripheral portions 40 due to the heat deformation of the film 14 by the elements 28. Of course, the actual aperture shape is primarily a function of the cross-sectional shape of the element 28.

The elements 28 which have formed the apertures 38 are then moved past the heater 30 by the rotational movement of drum 20 and any excess plastic remaining on the upper ends of the elements 28 are burned off at the said elevated first predetermined temperature. These elements are thereafter moved past the air cooler 34 to reduce the temperature of the elements to that which is desired to form the apertures 38 as described hereinabove. In order to further insure the cleaning of the elements 28, a wiper, flicker or planar bar 29 is positioned in the path of the elements 28 subsequently to the burning station or operation so that the elements 28 brush past such bar 29 which is disposed in a manner to traverse the entire width of the drum 20. The flicker bar 29 is desirable for materials such as vinyls which are hard to perforate and which leave a strong acid deposit on the elements. Thus, the bar 29 aids in wiping the ends of the elements 28 clean. Preferably, an "interference" of about 0.010 inch with the elements produces satisfactory results. Of course, to burn off the excess deposit on the elements 28, the temperature employed must be slightly above the melting temperature of the built up deposit. It will be appreciated that the temperatures employed are determined by the type of plastic film material utilized and by the type of deposit formed on the heating elements. Some plastic materials leave a slight deposit which is readily removed and other materials such as the vinyls are more difficult to overcome.

It will be appreciated that the heater 30, in the process of burning off the excess plastic from the elements 28, may raise the temperature thereof above that which is desirable for forming apertures in the film. Therefore, it may be desirable to provide means for thereafter reducing the temperature as by the controlled air cooler 34. Of course, other methods for accomplishing the above are also possible, one possibility being to enlarge the diameter of the drum or to reduce the speed of rotation thereof so as to provide sufficient time for cooling under ambient conditions. Another possibility will be discussed later in connection with an alternate embodiment of this invention. In any event, it is highly desirable to employ sensitive heat controls for maintaining the temperature of the elements 28 within the desired predetermined temperature range. Such heat controls, such as models manufactured by the Ircon Company are capable of sensing the temperature of the elements and controlling the heater as a function thereof, thus maintaining precisely said first and second predetermined temperatures.

After the film 14 has been perforated by means of the burning of apertures 38 therein, the film may then be embossed, if desired, to pattern the same. For this purpose the apparatus may be provided with an embossing drum 39 and a pinch roller 41, which are disposed at some position after drum 20 and before spindle 16, as seen in FIG. 1.

It is herein to be noted that although the present invention has been described as utilizing externally positioned heating and cooling means, with respect to drum 20, and in particular heater 30 and air cooler 34, it is within the purview of the present invention to provide an apparatus wherein the heating and cooling means may be disposed within the drum 20.

For such an embodiment, a modification of the drum structure would be required so as to provide a heating element and associated heat conductive and insulative means. A heating element, preferably fabricated of nichrome ribbon, may be employed and teflon coated fiberglass may comprise the heat insulative material. Such material would serve to prevent flame penetration therethrough while permitting heat transfer to the strips 26 which will be sufficiently raised in temperature to heat the elements 28.

Figure 6:
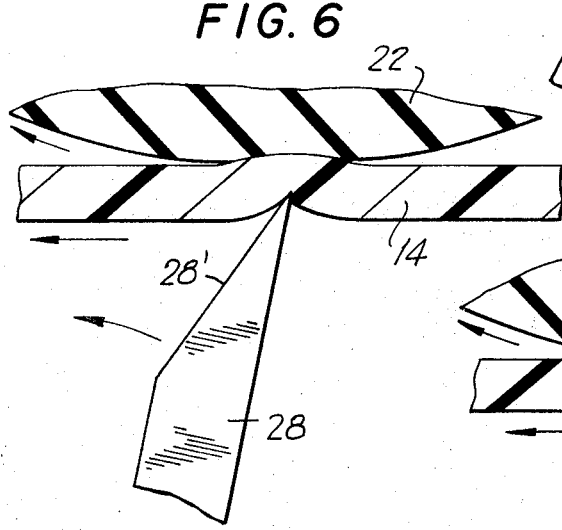
FIGS. 6, 7 and 8 are similar to FIG. 5 and depict the steps involved in the formation of a single aperture in accordance with the principles of the present invention.
Figure 7:
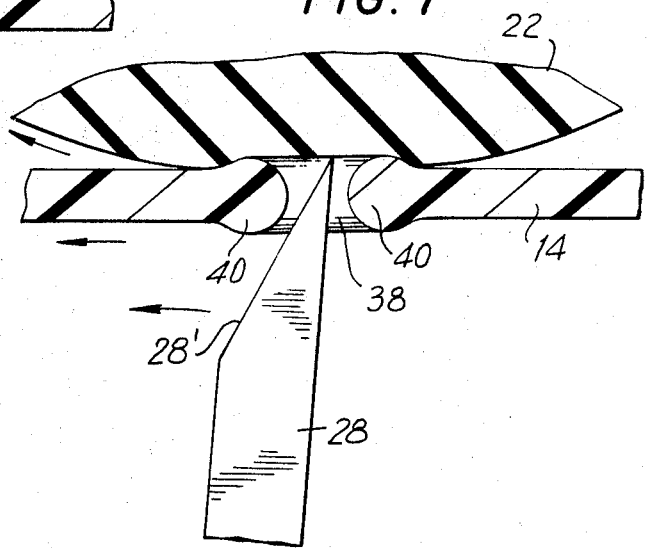
Figure 8:
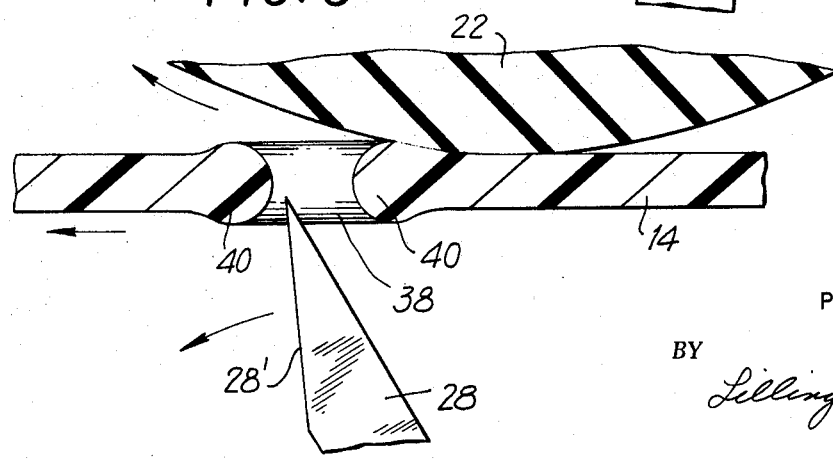

It will be understood that the apertures 38 primarily are formed in operation by the combination of heat and pressure. There is in reality no actual piercing of the film. As best seen in FIG. 6, the upper end of element 28 engages the plastic film 14 and presses the same in an upward direction, as viewed in the drawings. This upward pressure, however, does not puncture the film 14 and immediately after this initial pressure contact the heat from element 28 causes an aperture 38 to be burned in the film 14.

The formation of aperture 38, concomitantly therewith, forms raised or beaded peripheral portions 40. It is herein to be noted that these portions 40 are formed in the areas immediately adjacent the aperture 28. The formation of the beaded portion 40 serves as a reinforcement to prevent tearing of the film at the vicinity of the aperture 38.

It may also be desirable in operation to clean the elements 28 by passing them through a suitable fluid bath (not shown), such as a bath containing Dow Corning "200" fluid. Such cleaning fluid is a special grade which has been found satisfactory in operation.

Figure 9:
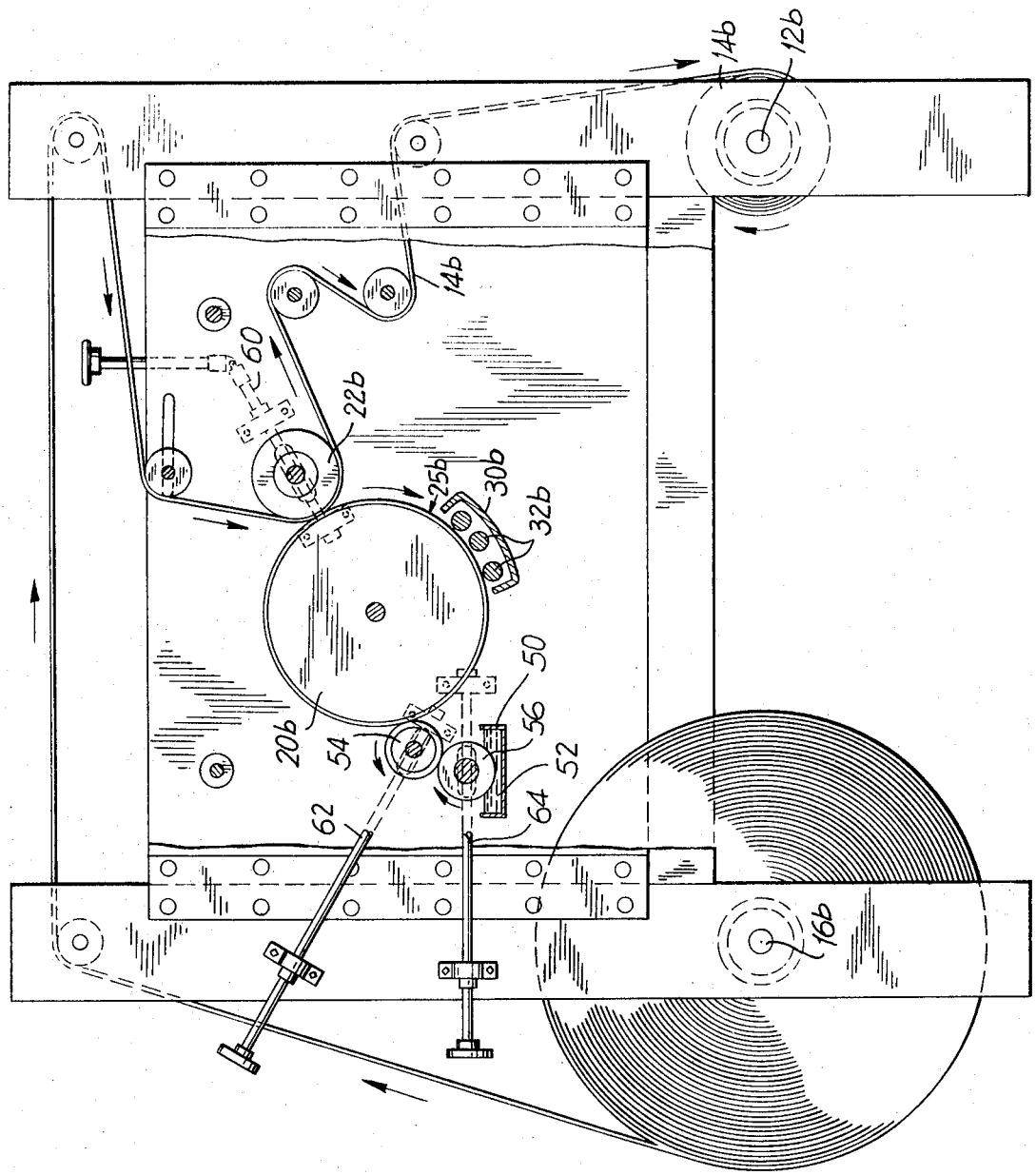
FIG. 9 is a schematic representation similar to FIG. 1 depicting an alternate embodiment of the apparatus of the present invention.

Another embodiment of the present invention is depicted by FIG. 9, where similar parts are denoted by similar reference numerals.

In the embodiment, the external surface 25b of the drum 20b passes a heater 30b having heating jets 32b at a position adjacent the engagement of the surfaces of the drum 20b and pinch roller 22b. However, the subsequent cooling of the heating elements (not shown) on the external drum surface is accomplished in the following manner.

The apparatus 10b is provided with a receptacle 50 containing a liquid solvent 52 of any suitable type, examples of which are water or water and ethylene glycol. The apparatus is also provided with transfer rollers 54 and 56 adapted to transfer liquid from the said receptacle to the surface of drum 20b. More particularly, the rotational movement of drum 20b causes opposite rotational movement of roller 54 which in turn causes corresponding rotational movement of roller 56, as compared with drum 20b. The rotational movement of roller 56 causes the external surface thereof to be immersed in the solvent 52 and to cause the solvent to be transferred therefrom to the surface of roller 54 and thence to the surface of drum 20b. The deposition of the solvent upon the external surface 25b of the drum causes the hearing elements thereon to be somewhat cooled and causes the temperature thereof to be decreased to the second predetermined temperature which is still substantially higher than ambient temperature and which is sufficient to cause apertures to be burned in the plastic film 14b. Thus, the effect of the solvent 52 is very similar to that of the air cooler 34 (FIG. 1).

The rollers 22b, 54 and 56 are provided with adjustable linkages 60, 62 and 64, respectively. The linkages are effective to adjust the frictional engagement of the rollers with the drum 22b, so as to achieve the desired results.

While I have shown and described the preferred embodiments of the method and apparatus of the present invention, it will be apparent to those skilled in the art that there are many modifications and/or improvements which may be made therein without departing from the scope of the invention as defined in the appended claims.

What is claimed is:

1. An apparatus for making a plastic film material porous, comprising: means for burning aertures in said plastic film material; means for moving said plastic film material into and out of burning engagement with said burning means so as to provide an apertured plastic film material; said burning means comprising a plurality of heatable elements, heating means for heating said elements to a first predetermined temperature, and said heatable elements upon contacting said plastic film material for a predetermined period of time burning said apertures therethrough; said first predetermined temperature being sufficiently high to burn off excess plastic deposited on said heatable elements during the burning of said apertures; and cooling means, said cooling means being applied to said heatable elements after they have been heated to said first predetermined temperature, and being operable to reduce the temperature of said heated elements to a second predetermined temperature, and said heated elements at said second predetermined temperature engaging said plastic film to burn said apertures therein.

2. An apparatus in accordance with claim 1, wherein said plastic film material is a web of material, and said moving means unrolls said web of material continuously past said burning means and then rerolls the same in the form of an apertured web of plastic material.

3. An apparatus in accordance with claim 1, wherein said apparatus includes a drum, means for rotating said drum about its longitudinal axis, said moving means being operable to move said plastic film material past the drum tangent to the outer surface of said drum, and means for mounting said heatable elements on the outer surface of said drum.

4. An apparatus in accordance with claim 3, wherein said heating means is disposed adjacent the external surface of said drum at a position which is subsequent in time to the burning of the apertures in the plastic film by said heated elements.

5. An apparatus in accordance with claim 4, wherein said cooling means is disposed adjacent the external surface of the drum at a position which is prior in time to the burning of the apertures in the plastic film and subsequent to the heating of said elements by said heating means.

6. An apparatus in accordance with claim 5, further comprising a wiper bar disposed adjacent said drum and in an interfering position with respect to said heatable elements, whereby said heatable elements as wiped as said drum rotates.

7. An apparatus in accordance with claim 6, wherein said heatable elements are in the form of U-shaped staples secured to reinforced carrier strip means.

8. An apparatus in accordance with claim 3, wherein said cooling means is an air cooling means.

9. An apparatus in accordance with claim 3, wherein said cooling means is a liquid solvent cooling means.

10. An apparatus in accordance with claim 3, wherein said heating means is a gas heater.

11. An apparatus in accordance with claim 3, wherein said means for mounting said heatable elements on the outer surface of said drum includes at least one carrier strip secured to said drum and disposed on the outer surface thereof, and means for connecting said heatable elements to said carrier strip.

12. An apparatus in accordance with claim 11, wherein the apertures formed by the burning of said plastic film by said heated elements have a substantially irregular shaped configuration.

13. An apparatus in accordance with claim 12, wherein the peripheral areas surrounding said apertures are thickened by the formation of the apertures and serve to reinforce the peripheral areas against tearing thereat.

14. An apparatus in accordance with claim 11, wherein said heatable elements are disposed upon the drum surface so as to form a perforated pattern having an irregular geometric configuration upon said plastic film material, whereby there are no distinct longitudinal and lateral tear lines in said plastic film material.

15. An apparatus in accordance with claim 12, wherein said irregular geometric configuration provides a spiral perforated pattern on said plastic film material having a helix angle of about 4° to about 5°.

16. A method of making a plastic film material porous comprising the steps of: heating a plurality of heatable elements to a first predetermined temperature, passing said plastic film material over said heated elements in burning engagement therewith so as to burn a high multiplicity of relatively small apertures in said film material; said first predetermined temperature being sufficiently high to burn off excess plastic deposited on said heatable elements during the burning of said apertures in said film material, and cooling said heated elements to a second predetermined temperature prior to the burning engagement of said heated elements and said plastic film material; said second predetermined temperature being sufficiently high to burn said apertures in said film material but being less than said first predetermined temperature; and said burned apertures having a reinforced peripheral edge.

17. The method of claim 16, wherein the step of cooling is performed by means of an air cooler.

18. The method of claim 16, wherein the step of cooling is performed by means of a liquid solvent.

19. The method of claim 16, wherein the step of heating said heatable elements to said first predetermined temperature is by means of a gas heater.

* * * * *